United States Patent Office 3,667,704
Patented June 6, 1972

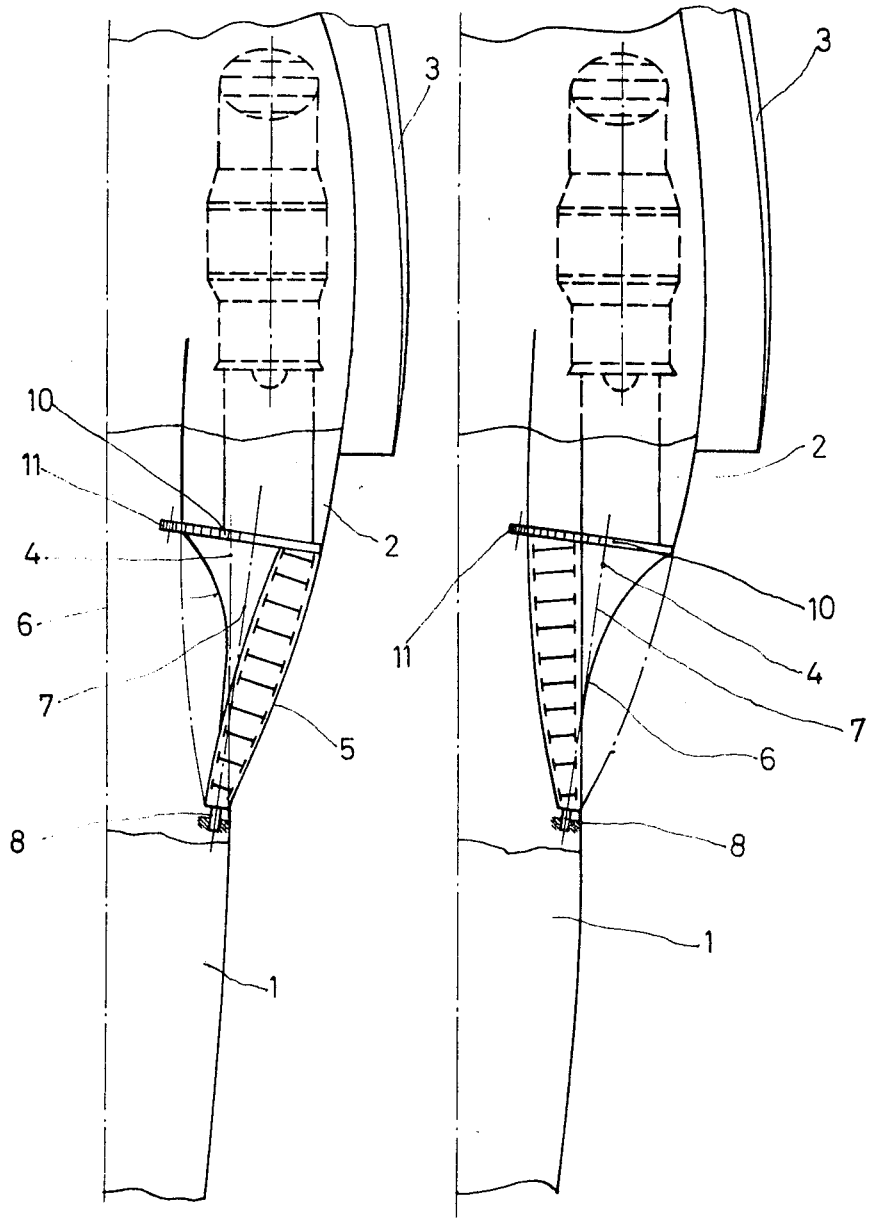

3,667,704
CLOSABLE AIR INTAKE DUCT MOUNTED ON THE FUSELAGE AND OPEN IN THE DIRECTION OF FLIGHT
Karl H. Assmann, Germering, Germany, assignor to Messerschmitt-Bolkow-Blohm GmbH, Munich, Germany
Filed May 5, 1970, Ser. No. 34,693
Claims priority, appplication Germany, May 23, 1969, P 19 26 553.3
Int. Cl. B64d 33/02
U.S. Cl. 244—53 B    5 Claims

ABSTRACT OF THE DISCLOSURE

Door for the air intake duct of auxiliary engine of jet aircraft. The door is pivotally mounted at the forward end of the recess in the fuselage which recess is normally provided and aligned with the air intake duct for the auxiliary engine. In open position the door surfaces are aligned with the surfaces of the auxiliary air intake duct while in closed position the door provides a surface aligned with the inner surface of the main air intake duct.

---

The invention relates to a closable air intake duct mounted on the exterior of the fuselage and open in the direction of flight, for jet engines which are installed in the airframe, and particularly for auxiliary engines which are shut down during flight.

Such auxiliary engines are normally used to generate lift/thrust in V/STOL aircraft during the takeoff and landing phases. However, consideration has been given to use of auxiliary engines to assist the cruise engines in order to improve, for instance, the maneuverability and acceleration of combat aircraft.

Lift engines of the prior art which are installed in the fuselage are generally mounted vertically with the jet nozzle pointing downwardly and the air intake located on the dorsal surface of the fuselage. The prior art (DAS 1,185,931) also includes an arrangement involving two lift engines arranged in tandem in the fuselage with their intake on the dorsal surface of the fuselage and closable by a door 3. To improve the intake conditions, rotatable scoops are provided which can be retracted into the fuselage contour and extended into the airstream so as to scoop air. However, an arrangement of this kind is suitable only for extremely low-speed flight, i.e., for the takeoff and landing phases, since it is impossible, with reasonable engineering effort, to design the doors and scoops, their mountings and operating mechanisms such that they can resist the high impact pressures prevailing at high subsonic speeds. Moreover, the aerodynamic efficiency of solutions of this kind is very low, as eddies and wake regions develop behind the doors and scoops which lead to heavy aerodynamic losses.

It is also known to the prior art to accommodate a closure element in the wall of the air intake duct which can be swivelled in front of the intake opening when the jet engine is not in operation. However, this solution is very complex from the constructional point of view, and there is moreover the disadvantage that the intake lip cannot be optimally designed as it must have a certain minimum thickness to accommodate the closure element (DBP 1,139,753).

Therefore, major objects of the present invention are to provide an air intake duct of the type mentioned above which has high aerodynamic efficiency in both the opened and closed conditions, which involves minimum constructional complexity, which will have maximum resistance to the impact pressures at high flight speeds and which does not affect the profile of the intake lip.

The invention achieves this by providing a door which can be extended from the fuselage contour in front of the intake opening and, when extended, constitutes the forward aerodynamic fairing of the air intake duct. In its retracted state this cover door forms the fuselage surface in the air intake area and is completely faired into the fuselage contour and at the same time opens the intake opening. In its extended position, it closes the intake opening and forms an excellent aerodynamic transition between the intake duct and the fuselage contour. This door can therefore be opened, i.e., retracted into the fuselage contour, at all speeds without danger of damage.

According to a preferred embodiment of the invention, the air intake duct for the auxiliary engines, particularly of supersonic aircraft, is arranged within the main intake duct for the cruise engines, the door forming the supersonic wedge or cone of the main-intake duct.

In the case of an air intake duct with a two-dimensional for example rectangular, intake opening, the invention provides that the door be box-shaped and pivot about an axis which is approximately perpendicular to the flow direction and that it be hinged at the forward edge of the cover.

If a conventional semi-circular intake opening is involved, the invention provides that the door be shaped like a cone with a cutout portion and with its apex pointing in direction of flight and that it be rotatable about an axis which is approximately parallel to the inflow direction.

Several embodiments of the invention are shown in the drawing and are described in greater detail in the following:

FIG. 3 is a plan view, partly sectional, of an arrangement according to FIG. 1 with the auxiliary intake closed;

FIG. 4 is a view according to FIG. 3 with the auxiliary intake opened;

Figure 1:
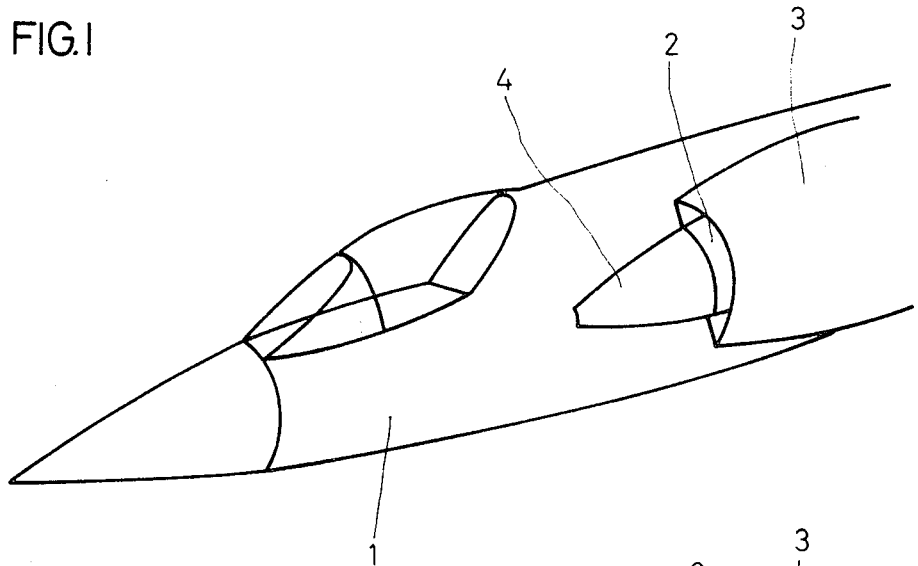
FIG. 1 shows a perspective view of an aircraft with the auxiliary intake, arranged within the main intake, in the closed position.

FIG. 1 shows the forward fuselage of a fighter aircraft from the forward end back to the engine air intake. The air intake duct 2 for the auxiliary engines is surrounded by the main intake duct 3 for the cruise engines. The approximately conical door 4 for the air intake duct 2 is located at the end of the air intake duct and within the usual recess in the fuselage normally aligned with said duct. The point of the conical door is within the fuselage and the sides are substantially flush with the outer surfaces of the intake duct 2. As shown in FIG. 1 the door 4 is closed and it constitutes the supersonic cone for the main intake duct 3 so that a typical supersonic intake is formed.

In this configuration, only the cruise engines are operating, whereas the auxiliary engine(s) is (are) not operating.

Figure 2:
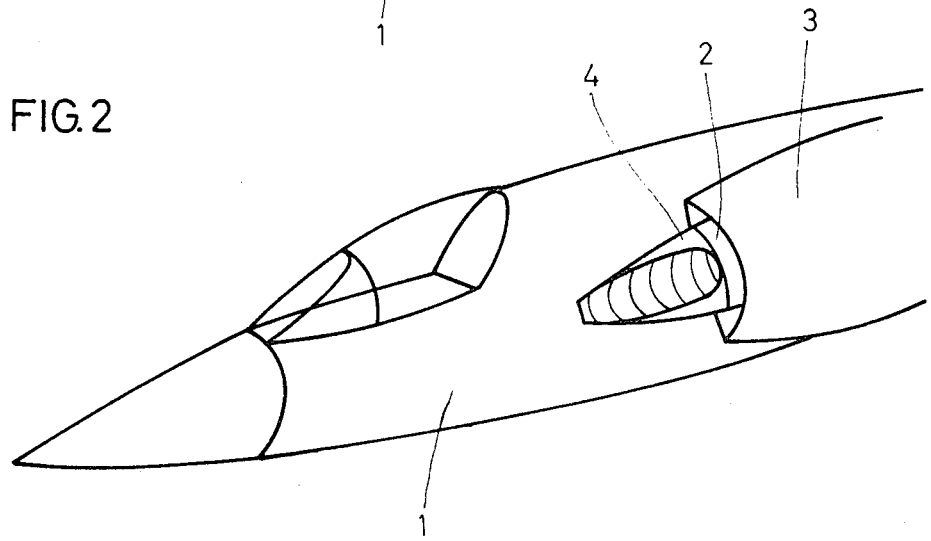
FIG. 2 shows a view according to FIG. 1 but with the auxiliary air intake opened.

By rotating door 5 about an axis which more or less coincides with the axis of the cone, the opening of the air intake duct 2 is cleared. At the same time, the inner contour of the door 4, which is optimally profiled to serve as an intake for the auxiliary engine, is turned outwards as shown in FIG. 2. The door 4 has two profiles, as is more clearly shown in FIGS. 3 and 4. The outer contour is generally conical and so curved that it closes off the opening of the air intake duct 2 in the position shown in FIG. 3. The inner contour 6 is formed by providing a cutout in the cone shell and constitutes the opening of the air-intake duct 2.

The door 4 rotates about axis 7 and is mounted on the fuselage structure by pivot 8. For operation, the door 4 is provided with a rim gear 10 driven by a pinion 11.

Figure 5:
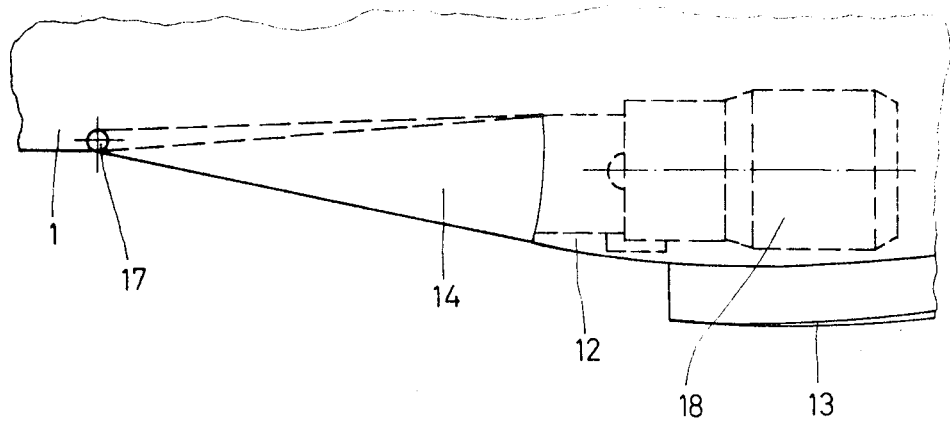
FIG. 5 is a view according to FIG. 3, but with a hinged shield cover for two-dimensional air intakes.
Figure 6:
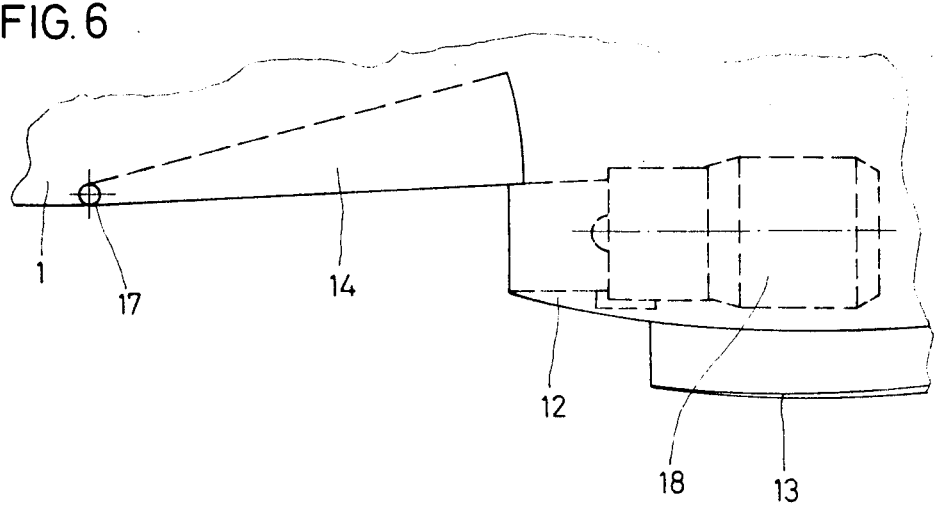
FIG. 6 is a view according to FIG. 5 with the shield cover open.

An embodiment of the invention for two-dimensional air intake ducts is shown in FIGS. 5 and 6. Door 14 which is more or less box-shaped and which is adapted to the rectangular section of air intake duct 12 is likewise located within the recess in the fuselage aligned with the intake duct and is pivotally mounted at its forward end to assume two positions.

In its extended condition it completely closes off the opening of the air intake duct 12 and at the same time constitutes the supersonic cone of the main intake duct 13. When the door 14 is pivoted about its rotation axis 17 into the fuselage, it is completely flush with the fuselage contour and offers no parasitic flow resistance. At the same time it clears the opening for the auxiliary engine 18 which in this case is used only for lift purposes.

The embodiments of the invention in which an exclusive property or privilege is claimed are defined as follows:

1. In an aircraft having a fuselage, at least one cruise engine and at least one auxiliary engine, the combination comprising:
   means defining a main air intake duct on said fuselage communicating with said cruise engine;
   means defining an auxiliary air intake duct on said fuselage communicating with said auxiliary engine, the cross section of said auxiliary intake duct means being smaller in size than the cross section of said main intake duct and is positioned internally of said main air intake duct means; and
   door means supported for movement between open and closed positions relative to said auxiliary air intake duct means, said door means being positioned frontwardly of both said auxiliary air intake duct means and said main air intake duct means and including profile means defining a supersonic cone for said main air intake duct means when in said closed position.

2. An aircraft according to claim 1 wherein said profile means on said door means is conically shaped, said door means includes support means for supporting said door means for rotatable movement about the axis of said cone, said axis of said cone extending generally parallel to the flow direction of air to said engines, said profile means on said door means further defining the forward aerodynamic fairing for said main air intake duct means when said door means is in the closed position, said door means including additional profile means defining a forward extension of said auxiliary air intake duct means when said door means is in the open position.

3. An aircraft according to claim 1 wherein said door means includes hinge means for hingedly supporting said door means for movement about an axis generally perpendicular to the flow direction of air to said engines.

4. An aircraft according to claim 3 wherein said hinge axis is located at the front edge of said door means.

5. An aircraft according to claim 1 wherein said profile means on said door means comprises a cone, the apex of which is located at the forward end of said door means and the axis of said cone extends generally parallel to the flow direction of said air to said engines to thereby defines said supersonic cone and the forward aerodynamic fairing for said main air intake duct means when said door means is in the closed position, said door means further including additional profile means defining a cutout which is alignable with said auxiliary air intake duct means to thereby define a forward extension of said auxiliary air intake duct means when said door means is in the open position.

References Cited
UNITED STATES PATENTS

| | | | |
|---|---|---|---|
| 2,755,040 | 7/1956 | Pinkos et al. | 244—53 B |
| 3,001,740 | 9/1961 | Montgomery | 244—53 B X |
| 3,066,892 | 12/1962 | Smith et al. | 244—53 B |
| 2,934,893 | 5/1960 | Streeter | 137—15.1 |
| 3,439,692 | 4/1969 | Pike | 137—15.2 |
| 2,876,621 | 3/1959 | Bogert et al. | 244—53 B X |
| 3,109,610 | 11/1963 | Quenzler et al. | 244—53 B X |
| 3,253,404 | 5/1966 | Tonnies | 137—15.1 |

MILTON BUCHLER, Primary Examiner

J. L. FORMAN, Assistant Examiner

U.S. Cl. X.R.

137—15.1